United States Patent
Nicholas et al.

(10) Patent No.: US 7,111,229 B2
(45) Date of Patent: Sep. 19, 2006

(54) SYSTEM AND METHOD FOR PROVIDING A WEBPAGE

(75) Inventors: Ethan R. Nicholas, San Jose, CA (US); Veena Y. Dong, Fremont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 136 days.

(21) Appl. No.: 10/607,452

(22) Filed: Jun. 25, 2003

(65) Prior Publication Data
US 2005/0022128 A1    Jan. 27, 2005

(51) Int. Cl.
G06F 17/21 (2006.01)
G06F 17/27 (2006.01)
G06F 17/24 (2006.01)

(52) U.S. Cl. .............. 715/511; 715/500; 715/513; 715/517; 715/530; 715/738; 715/760; 715/764

(58) Field of Classification Search ........ 715/500, 715/511, 513, 517, 530, 738, 760, 764
See application file for complete search history.

(56) References Cited

U.S. PATENT DOCUMENTS

| | | | |
|---|---|---|---|
| 6,327,628 B1 * | 12/2001 | Anuff et al. | 719/311 |
| 6,546,397 B1 * | 4/2003 | Rempell | 707/102 |
| 2002/0023111 A1 * | 2/2002 | Arora et al. | 707/513 |
| 2004/0039795 A1 * | 2/2004 | Percival | 709/218 |
| 2004/0148307 A1 * | 7/2004 | Rempell | 707/102 |

OTHER PUBLICATIONS

Martin S. Matthews et al., FrontPage 2000: The Complete Reference, 1999, Osborne/McGraw-Hill, pp. 65, 67-71, 128-129, 133, 141-142, and 856-857.*
Martin S. Matthews et al., Frontpage 2000: The Complete Reference, 1999, Osborne/McGraw-Hill, pp. 64, 66, and 117-120.*
Microsoft Word, "Save Options", Microsoft Corporation, 1999, Microsoft Word 2000.*
Microsoft Support, FP2000: Differences Between the Preview Tab and Preview In Browser, Sep. 27, 2001, Microsoft Corporation, p. 1, <http://support.microsoft.com/default.aspx?scid=kb;EN-US;197998>.*
Martin S. Matthews et al., Frontpage 2000: The Complete Reference, 1999, Osborne/McGraw-Hill, p. 474 (additional page of previously provided reference).*
Notification of Transmittal of the International Search Report and the Written Opinion of the International Searching Authority, or the Declaration as received in corresponding PCT international application No. PCT/US04/20727.

* cited by examiner

Primary Examiner—Stephen Hong
Assistant Examiner—Joshua D Campbell
(74) Attorney, Agent, or Firm—Hickman Palermo Truong & Becker LLP

(57) ABSTRACT

A system and method are disclosed for providing a webpage comprising receiving instructions for previewing a page; creating a preview version of the page, wherein links are modified to reflect a location of the preview version; and displaying the preview version of the page.

14 Claims, 5 Drawing Sheets

SYSTEM AND METHOD FOR PROVIDING A WEBPAGE

FIELD OF THE INVENTION

The present invention relates generally to webpages. More specifically, a system and method for creating or modifying a webpage is disclosed.

BACKGROUND OF THE INVENTION

Webpage designers are turning more frequently to webpage design tools. Often, a user will open and edit multiple webpages simultaneously when using a design tool. The complexity of juggling multiple pages can be difficult to manage and coordinate changes among the various pages. What is needed is a system and method for efficiently creating and modifying a webpage. The present invention addresses such a need.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Figure 1A:
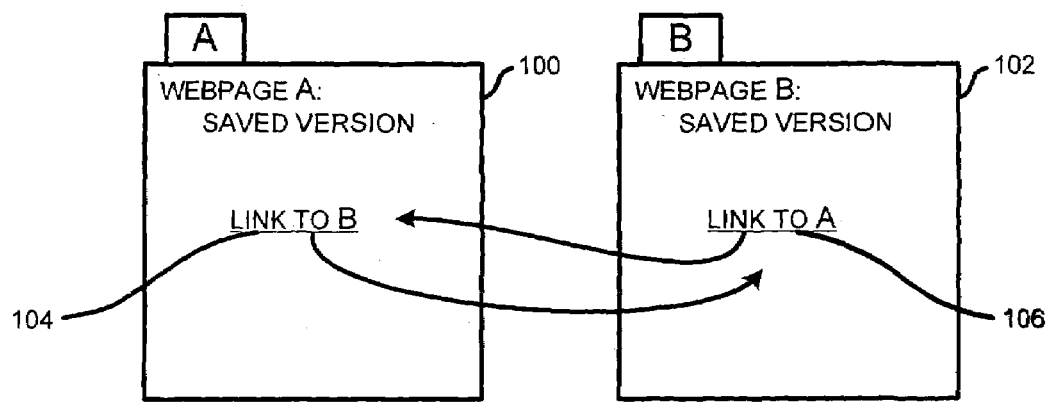
FIGS. 1A–1B are block diagrams of a system and method for modifying a webpage according to an embodiment of the present invention.
Figure 1B:
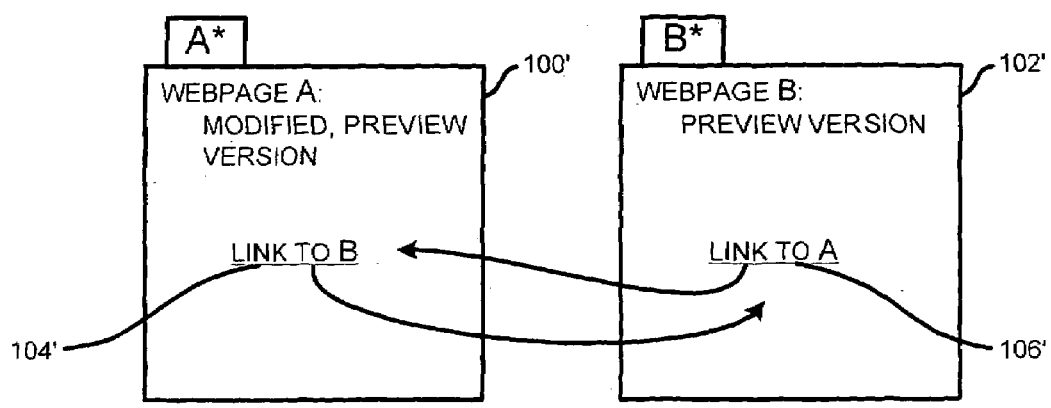

FIGS. 1A–1B are block diagrams of a system and method for modifying a webpage according to an embodiment of the present invention. The word modify, as used herein, includes but is not limited to, creating a new webpage as well as modifying an existing webpage. Likewise, the word create or creating, as used herein, includes but is not limited to, creating a new webpage as well as modifying an existing webpage. FIG. 1A shows a simplified example of a webpage which includes page 100 and page 102. In this example, page 100 includes a link to webpage 102. Webpage 102 is shown to also include a link to webpage 100. If the user modifies webpage 100, and then chooses to preview either webpage 100 or 102, then the latest version of webpages 100–102 are shown so that if the user selects the link 106 to webpage 100, then the modified version of webpage 100 is displayed rather than the old, unmodified version. Likewise, if the user has modified webpage 102, if the user selects the link 104 to webpage 102, then the most recently modified version of webpage 102 is shown, regardless of whether he has saved the latest modification.

In FIG. 1B, a preview version of the modified webpage 100' is shown along with a preview version of webpage 102'. In this example, a preview version 100' of webpage 100 is created and saved, preferably when a preview command is selected by the user or when the webpage 100' is saved, in order to capture changes made by the user. The preview versions of the webpages 100'–102' contain modified links 104'–106'. The modified links 104'–106' are modified to link to the preview versions webpage 100' and webpage 102' rather than the saved versions 100–102. In this manner, the links are consistent to the user when the user previews a webpage prior to saving his changes. For example, if the user makes changes to webpage 100 and webpage 102, when he chooses to preview webpage 102, he will see the preview version 102' and when he selects the link 106' to webpage A, then the preview version of webpage 100' will be displayed. Likewise, when he selects link 104' to webpage B, then the preview version 102' will be displayed. Accordingly, the preview versions of the webpages will appear consistent during modification.

If the links are not rendered until the web browser launches, then the assets associated with the links can be modified so that when the links are rendered, modified versions of the assets will be displayed. Alternatively, the links themselves can be modified.

Figure 2:
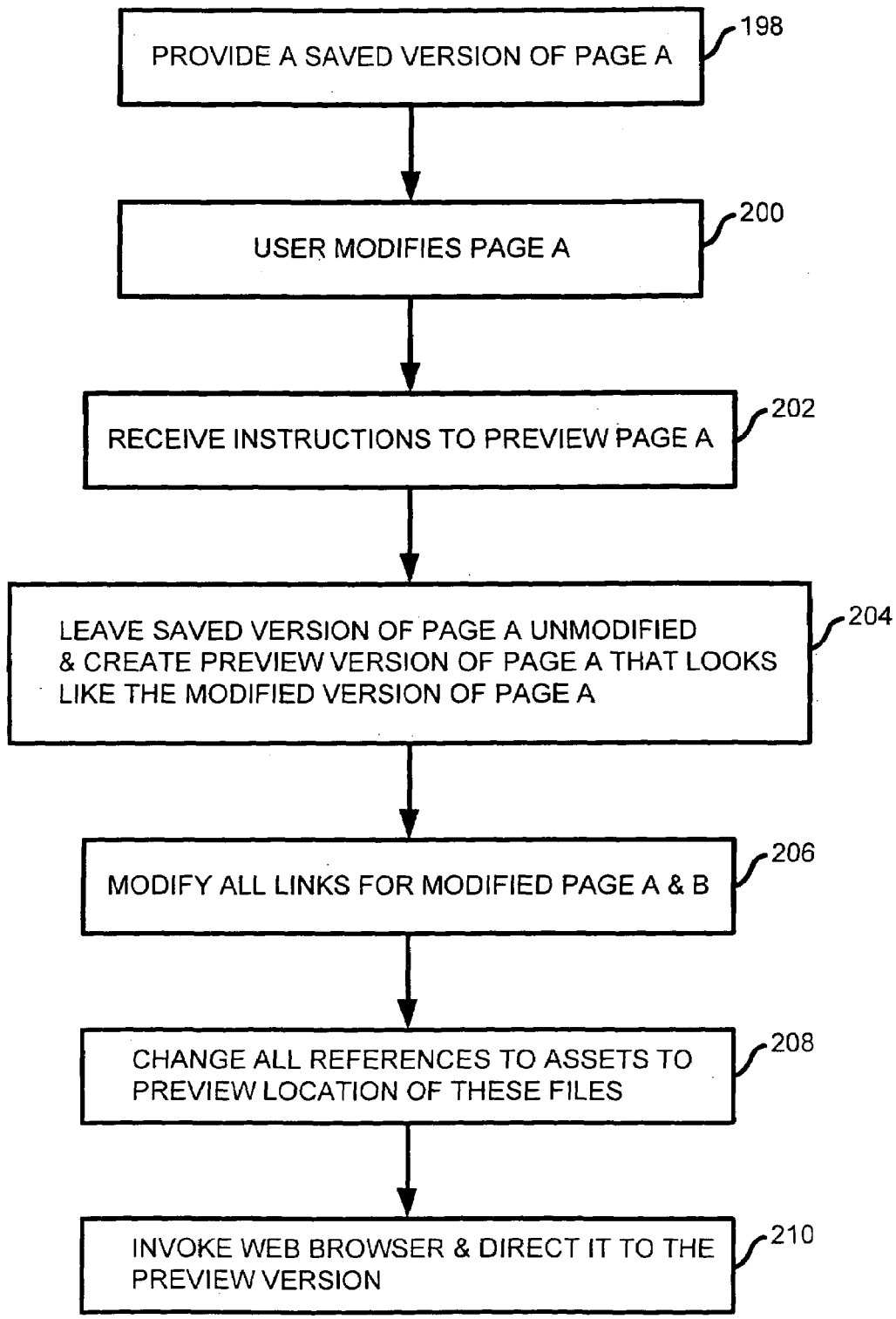
FIG. 2 is a flow diagram of a method according to an embodiment of the present invention for modifying a webpage.

FIG. 2 is a flow diagram of a method according to an embodiment of the present invention for modifying a webpage. In this example, two pages are open. A saved version of page A is provided (198). This saved version can be a preexisting page or a new, blank page that has not yet been customized. Page A is modified by a user (200). Instructions are received to preview page A (202). The saved version of page A is left unmodified and a preview version of page A is created which looks like the modified version of page A (204). In one embodiment, all files currently open and modified since the last preview has a preview version created that look like the current pages, regardless of whether the latest changes had been saved. In one embodiment, the preview versions can be generated every time a file is saved in addition to or instead of creating the preview versions when the user selects to preview a page. Additionally, a preview version of all files that have no current preview versions can be created, for example when a file is saved or when a preview instruction is received. One example of creating a preview version is to regenerate the entire file in the latest modified form.

Links for the webpages are modified so that the links point to the proper preview page at the preview location upon which the preview page is saved (206). In one embodiment, the memory location of the saved webpage is replaced in the link with the preview location of the corresponding preview page. Accordingly, if the preview location is the same as the memory location of the saved webpage, then the actual link may remain the same since it will be replaced with the same information. In another embodiment, there could be a determination of whether the link should be changed rather than substituting all links.

All references to assets in the webpages are changed to the preview location of these files (208). An asset, as referred to herein, includes any file which can be incorporated into a website, such as html files, images, or animation. An example of a preview location is cache or a different memory location rather than the memory location where the saved version of the asset is located. Changing the references to assets to the preview location of these files will facilitate consistency of the various pages when the user wishes to preview them.

The web browser is then invoked and directed to the preview version of page A (210).

Figure 3:
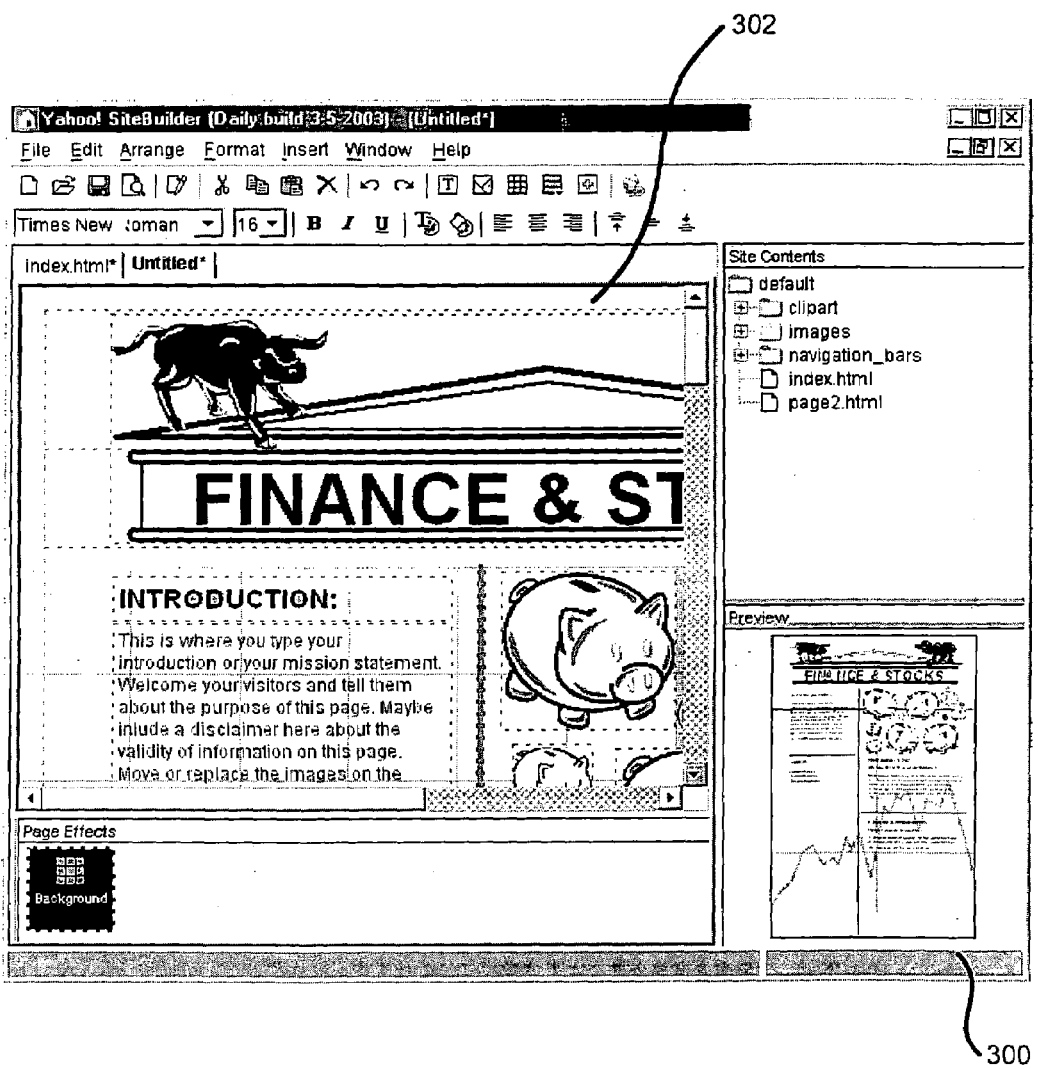
FIG. 3 is an example of a screen shot illustrating a live preview pane according to an embodiment of the present invention.

In another aspect of the invention, a preview pane can be used to substantially immediately show the effects of a modification of a webpage. FIG. 3 is an example of a screen shot illustrating a live preview pane according to an embodiment of the present invention. In this example, a webpage 302 is being modified by a user. The preview pane 300 shows a preview of what the webpage 302 will look like. Changes to webpage 302 are reflected in the preview pane 300. In one embodiment, the changes made to webpage 302 are immediately updated in the preview pane 300. In another embodiment, the preview pane 300 can be updated periodically, for example, if the user makes a change on webpage 302, then a timer can be set and the preview pane 300 can be updated a half a second later so that all of the changes made within that time period can be updated together in the preview pane 300.

The preview pane 300 can be modified so that extraneous items such as border, highlights, or grid, are shown in webpage 302 are not displayed in preview pane 300. In one embodiment webpage 302 momentarily turns off the borders, highlights, and grid, or anything else that would not normally be seen in the final published webpage, and is rendered without the turned-off components in preview pane 300, then turned back on in page 302. This sequence preferably occurs fast enough so that it is not noticeable by the user.

In rendering the preview pane 300, each object on page 302 can be made to paint itself onto preview pane 300. Accordingly, the graphics context of the object is created, scaled to a small size appropriate for the preview pane 300. Each object is then instructed to paint itself to the graphics context and then display on the screen in preview pane 300.

Figure 4:
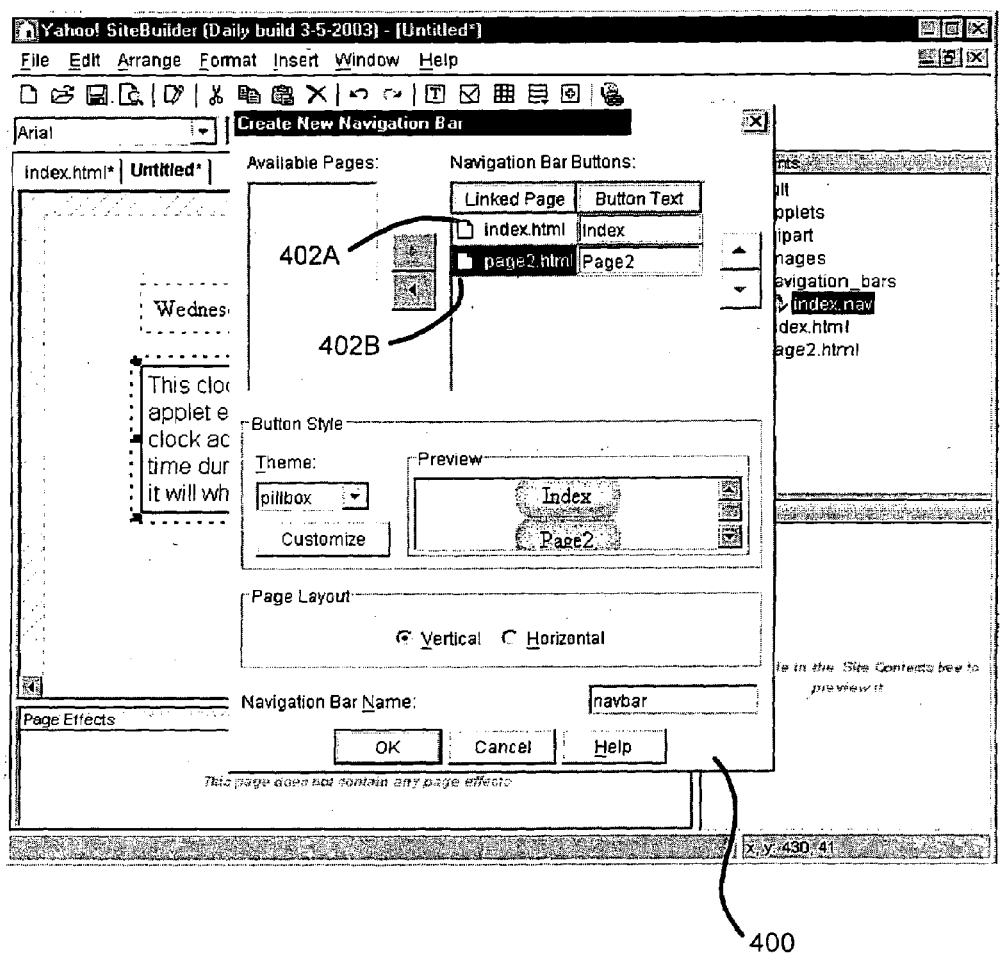
FIG. 4 is a screen shot of a navigation bar creation window according to an embodiment of the present invention.

In yet another aspect of the invention, a navigation bar is disclosed. FIG. 4 is a screen shot of a navigation bar creation window according to an embodiment of the present invention. In this example, a navigation bar window 400 lists all pages 402A–402B on the website so that the user can select the pages to become part of the navigation bar. A theme can also be selected for the button effects and rollovers so that the user can automatically select a set of appearances for the buttons when they are unselected, when the mouse rolls over the button, and when they are selected. The navigation bar's appearance can also be previewed in a preview window.

Figure 5:
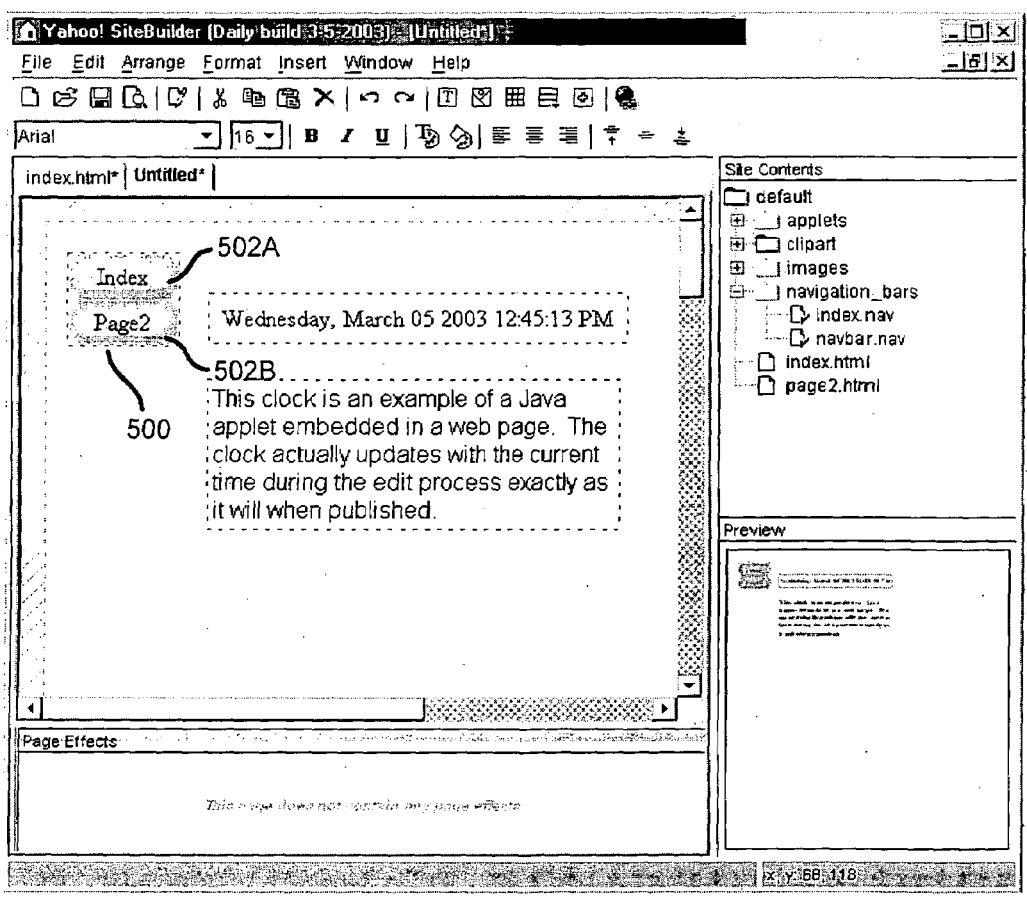
FIG. 5 shows an example of a navigation bar according to an embodiment of the present invention.

FIG. 5 shows an example of a navigation bar 500 which can be viewed as a set of buttons that link to various locations within the website. These buttons on the navigation bar 500 can function as a single object so that when the user drags the navigation bar 500, all of the buttons 502A–502B move as a single object. The images associated with the navigation bar 500 can be rendered at publish time. Each button 502A–502B of the navigation bar 500 can have multiple images, such as three images: mouse rollover, active, and inactive, wherein the mouse rollover is when the cursor is on a button, active is the page that is being displayed, and inactive is a page that this not being displayed. The navigation bar 500 is an asset that can be added to many pages and when the navigation bar 500 is changed, the changed bar 500 can be seen in all the webpages without having to change it for each individual page.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of displaying a preview version of a first webpage, comprising the computer-implemented steps of:

creating a modified version of the first webpage in response to receiving a first modification to the first webpage, wherein said modified version of the first webpage is stored separate from a saved version of the first webpage that does not reflect said first modification;

wherein a saved version of a second webpage includes a first link;

wherein the first link is a link to said saved version of the first webpage;

wherein a preview version of said second webpage has been modified, relative to said saved version of the second webpage, so that within said preview version of said second webpage said first link has been replaced with a second link;

wherein the second link is a link to said modified version of said first webpage;

prior to said first modification being saved to said saved version of the first webpage, performing the step of responding to a request to preview the second webpage by displaying said preview version of the second webpage; and responding to a selection of the second link in the displayed preview version of the second webpage by displaying as a preview of said first webpage, said modified version of the first webpage that reflects the first modification.

2. The method of claim 1, wherein the step of displaying the preview version of the first webpage that reflects the first modification comprises the steps of:

creating preview version of the first webpage that includes the first modification;

modifying the link in the preview version of the first webpage to a location for the preview version of the second webpage; and displaying the preview version of the first webpage.

3. The method of claim 1, wherein the first webpage includes a reference to an asset, wherein the step of displaying a preview version of the first webpage further comprises displaying a preview version of the first webpage that includes a reference to a preview version of the asset, wherein the preview version of the asset reflects a modification to the asset that has not been saved.

4. The method of claim 3, wherein the asset is an image, and wherein the step of displaying a preview version of the first webpage that includes a reference to a preview version of the asset comprises displaying a preview version of the first webpage with a preview version of the image, wherein said preview version of the image reflects a modification to the image that has not been saved.

5. The method of claim 3, wherein the asset is a navigation bar designed in a window.

6. The method of claim 3, additionally comprising the step of:
   modifying the reference to the asset to a preview location for the asset, wherein the preview location is different from a saved version location for the asset.

7. The method of claim 1, wherein the saved version of the first webpage is a new blank page that has not yet been customized.

8. A computer readable medium comprising one or more sequences of instructions which, when executed by one or more processors, cause the one or more processors to perform the method recited in claim 1.

9. The method of claim of 1, additionally comprising the steps of:
   creating a modified version of the second webpage in response to receiving a second modification to the second webpage, wherein said modified version of the second webpage is stored separate from a saved version of the second webpage that does not reflect said second modification;
   prior to said second modification being saved to said saved version of the second webpage, responding to a selection of a link in the preview version of the first webpage to the second webpage by displaying the preview version of the second webpage that reflects the first modification.

10. The method of claim 1, wherein a saved version of the second webpage has a link to the saved version of the first webpage, additionally comprising the step of:
    in response to displaying a preview version of the second webpage, modifying the link in the preview version of the second webpage to cause the link to point to the preview version of the first webpage;
    wherein the selection is a selection of the modified link in the preview version of the second webpage.

11. The method of claim 1, wherein the preview version of the second webpage is created in response to a modification made to the second webpage being saved to the saved version of the second page.

12. The method of claim 1, wherein the preview version of the second webpage is created in response to a request to preview the second webpage.

13. The method of claim 1, wherein the preview version is created prior to receiving a request to preview.

14. An apparatus for displaying webpages, comprising:
    means for creating a modified version of the first webpage in response to receiving a first modification to the first webpage, wherein said modified version of the first webpage is stored separate from a saved version of the first webpage that does not reflect said first modification;
    wherein a saved version of a second webpage includes a first link;
    wherein the first link is a link to said saved version of the first webpage;
    wherein a preview version of said second webpage has been modified, relative to said saved version of the second webpage, so that within said preview version of said second webpage said first link has been replaced with a second link;
    wherein the second link is a link to said modified version of said first webpage;
    prior to said first modification being saved to said saved version of the first webpage, means for performing the step of responding to a request to preview the second webpage by displaying said preview version of the second webpage; and
    means for responding to a selection of the second link in the displayed preview version of the second webpage by displaying, as a preview of said first webpage, said modified version of the first webpage that reflects the first modification.

* * * * *

UNITED STATES PATENT AND TRADEMARK OFFICE
CERTIFICATE OF CORRECTION

PATENT NO. : 7,111,229 B2 Page 1 of 1
APPLICATION NO. : 10/607452
DATED : September 19, 2006
INVENTOR(S) : Ethan R. Nicholas et al.

It is certified that error appears in the above-identified patent and that said Letters Patent is hereby corrected as shown below:

COLUMN 4

Claim 1: Line 51, delete "displaying" and insert --displaying,--.

Claim 2: Line 57, delete "creating" and insert --creating the--.

Signed and Sealed this

Ninth Day of October, 2007

JON W. DUDAS
*Director of the United States Patent and Trademark Office*